US011546658B2

United States Patent
Yazdani et al.

(10) Patent No.: US 11,546,658 B2
(45) Date of Patent: *Jan. 3, 2023

(54) AUDIO CORRELATION FOR VIEWERSHIP DETERMINATION

(71) Applicant: comScore, Inc., Reston, VA (US)

(72) Inventors: Amir Yazdani, Portland, OR (US); Caroline Horner, Darien, CT (US); Michael J. Vinson, Piedmont, CA (US)

(73) Assignee: Comscore, Inc., Reston, VA (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/695,162

(22) Filed: Nov. 25, 2019

(65) Prior Publication Data
US 2020/0097798 A1   Mar. 26, 2020
US 2022/0215231 A9   Jul. 7, 2022

Related U.S. Application Data

(63) Continuation of application No. 16/260,896, filed on Jan. 29, 2019, now Pat. No. 10,491,950, which is a
(Continued)

(51) Int. Cl.
*H04N 21/442*     (2011.01)
*H04N 21/439*     (2011.01)
(Continued)

(52) U.S. Cl.
CPC ..... *H04N 21/44222* (2013.01); *G06N 3/0445* (2013.01); *G06N 3/0635* (2013.01);
(Continued)

(58) Field of Classification Search
CPC ............... H04N 21/233; H04N 21/251; H04N 21/41407; H04N 21/42203;
(Continued)

(56) References Cited

U.S. PATENT DOCUMENTS 7,260,837 B2   8/2007   Abraham et al.
9,621,446 B2   4/2017   Pugh et al.
(Continued)

OTHER PUBLICATIONS

Melanie Pinola, How Can I Find Out If Someone's Stealing My Wi-Fi?, Jan. 21, 2011, www.lifehacker.com.au, http://www.lifehacker.com.au/2011/01/how-can-i-find-out-if-someone%E2%80%99s-stealing-my-wi-fi/; Retrieved from https://www.gizmodo.com.au/2011/01/how-can-i-find-out-if-someones-stealing-my-wi-fi/ on Apr. 5, 2021, 4 pages.

*Primary Examiner* — Nicholas T Corbo
(74) *Attorney, Agent, or Firm* — Blank Rome LLP

(57) ABSTRACT

A method includes receiving audio data from a microphone of a device associated with a user. The audio data includes audio received by the microphone from a first source and from a second source. The audio data is correlated with a first audio signature and a second audio signature. Then, based on the correlation of the audio data with the first audio signature, first content broadcast from the first source is identified. Second content broadcast from the second source is also identified based on the correlation of the audio data with the second audio signature. It is then determined that the device is closer to the first source than the second source based on audio qualities and/or temporal aspects of the audio data. The first content is associated with the user based on the determination that the device is closer to the first source.

20 Claims, 7 Drawing Sheets

Related U.S. Application Data continuation of application No. 15/153,230, filed on May 12, 2016, now Pat. No. 10,237,616.

(60) Provisional application No. 62/162,170, filed on May 15, 2015.

(51) Int. Cl.

| | | |
|---|---|---|
| *H04N 21/44* | (2011.01) | |
| *H04N 21/233* | (2011.01) | |
| *H04N 21/25* | (2011.01) | |
| *H04N 21/414* | (2011.01) | |
| *H04N 21/422* | (2011.01) | |
| *G06N 3/04* | (2006.01) | |
| *G06N 3/063* | (2006.01) | |
| *G06N 3/08* | (2006.01) | |

(52) U.S. Cl.
CPC .............. *G06N 3/08* (2013.01); *H04N 21/233* (2013.01); *H04N 21/251* (2013.01); *H04N 21/41407* (2013.01); *H04N 21/42203* (2013.01); *H04N 21/4394* (2013.01); *H04N 21/44008* (2013.01)

(58) Field of Classification Search
CPC ......... H04N 21/4394; H04N 21/44008; H04N 21/44222; G06N 3/0445; G06N 3/0635; G06N 3/08
See application file for complete search history.

(56) References Cited

U.S. PATENT DOCUMENTS

| | | |
|---|---|---|
| 2002/0129368 A1 | 9/2002 | Schlack |
| 2006/0156392 A1 | 7/2006 | Baugher |
| 2008/0249905 A1 | 10/2008 | Wong et al. |
| 2008/0256235 A1 | 10/2008 | Or Sim et al. |
| 2009/0132559 A1 | 5/2009 | Chamberlain et al. |
| 2009/0182597 A1 | 7/2009 | Bull et al. |
| 2010/0131969 A1 | 5/2010 | Tidwell et al. |
| 2010/0228850 A1 | 9/2010 | Fomitchev |
| 2010/0299434 A1 | 11/2010 | Hanson et al. |
| 2011/0185016 A1 | 7/2011 | Kandasamy et al. |
| 2011/0283328 A1 | 11/2011 | Davis et al. |
| 2011/0289190 A1 | 11/2011 | Chamberlain et al. |
| 2012/0079519 A1 | 3/2012 | Fu et al. |
| 2012/0084828 A1 | 4/2012 | Rowe et al. |
| 2012/0131685 A1 | 5/2012 | Broch et al. |
| 2012/0142378 A1 | 6/2012 | Kim et al. |
| 2012/0166379 A1 | 6/2012 | Dasgupta et al. |
| 2012/0185229 A1 | 7/2012 | Perrett |
| 2012/0185299 A1 | 7/2012 | Kobayashi et al. |
| 2013/0007236 A1 | 1/2013 | Besehanic |
| 2013/0198376 A1 | 8/2013 | Landa et al. |
| 2013/0275205 A1 | 10/2013 | Vinson et al. |
| 2014/0082125 A1 | 3/2014 | Van et al. |
| 2014/0282655 A1 | 9/2014 | Roberts |
| 2014/0282663 A1 | 9/2014 | Lee |

AUDIO CORRELATION FOR VIEWERSHIP DETERMINATION

CROSS-REFERENCE TO RELATED APPLICATIONS

This application is a continuation of U.S. patent application Ser. No. 16/260,896, filed Jan. 29, 2019, which will issue as U.S. Pat. No. 10,491,950 on Nov. 26, 2019, which is a continuation of U.S. patent application Ser. No. 15/153,230, filed May 12, 2016, and issued as U.S. Pat. No. 10,237,616 on Mar. 19, 2019, which claims the benefit of U.S. Provisional Patent App. No. 62/162,170, filed May 15, 2015, which are incorporated herein by reference in their entirety.

TECHNICAL FIELD

The present disclosure relates generally to systems and processes for determining content accessed by a user, and more particularly, to systems and processes for determining content accessed by a user based on correlating captured audio with tuning data.

BACKGROUND

Using television and other content distribution channels (such as, but not limited to, online video received through a computer or mobile device, video content viewed on other screens, and so forth), advertisers often attempt to reach a specific demographic, for example, based on age, gender, and/or interests. One common advertising strategy is to broadcast an advertisement concurrently with media content (e.g., a television show) that is popular among that particular demographic. In that sense, it is often desirable to determine the audience of the media content to ensure that the advertisement is reaching the desired demographic.

Historically, the success of the advertisement has been determined by sampling polls, surveys, or panels to estimate the size and profile (e.g., age and gender) of the audience. However, the sampling polls are typically limited to a selected number of individuals, and therefore, do not provide sufficient accuracy or specificity in determining the exact size and profile of the audience. Furthermore, the sampling polls do not provide sufficient information of viewing habits for specific individuals. Moreover, such polls or panels are susceptible to statistical bias due to the requirement that respondents explicitly and consciously cooperate with the poll or panel.

The disclosed process and system are directed to mitigating or overcoming one or more of the problems set forth above and/or other problems in the prior art.

SUMMARY

The foregoing needs are met, to a great extent, by the systems and processes described herein. One aspect of the present disclosure is directed to a computer system. The computer system includes at least one processor and at least one memory storing instructions that, when executed, cause the at least one processor to perform a process. The process includes receiving audio data from a user device, and accessing content data including at least one audio signature associated with video content. The process also includes correlating the audio data with the at least one audio signature, and identifying recognized video content based on the correlation of the audio data with the at least one audio signature. The process also includes receiving tuning data including content being presented on a display component. The process further includes correlating the recognized video content with the tuning data, determining viewed video content based on the correlation of the recognized video content with the tuning data, and storing the viewed video content in a user array.

Another aspect of the present disclosure is directed to a computer-implemented method. The method includes receiving audio data from a user device, and accessing content data including at least one audio signature associated with video content. The method also includes correlating the audio data with the at least one audio signature, and identifying recognized video content based on the correlation of the audio data with the at least one audio signature. The method also includes receiving tuning data including content being presented on a display component. The method further includes correlating the recognized video content with the tuning data, determining viewed video content based on the correlation of the recognized video content with the tuning data, and storing the viewed video content in a user array.

Yet another aspect of the present disclosure is directed to a non-transitory computer-readable medium storing instructions which, when executed, cause one or more processors to perform a process. The process includes receiving audio data from a user device, and accessing content data including at least one audio signature associated with video content. The process also includes correlating the audio data to the at least one audio signature, and identifying recognized video content based on the correlation of the audio data with the at least one audio signature. The process also includes receiving tuning data including content being presented on a display component. The process further includes correlating the recognized video content with the tuning data, determining viewed video content based on the correlation of the recognized video content with the tuning data, and storing the viewed video content in a user array.

BRIEF DESCRIPTION OF THE DRAWINGS

The same reference numbers are used in the drawings and the following detailed description to refer to the same or similar parts.

Figure 1:
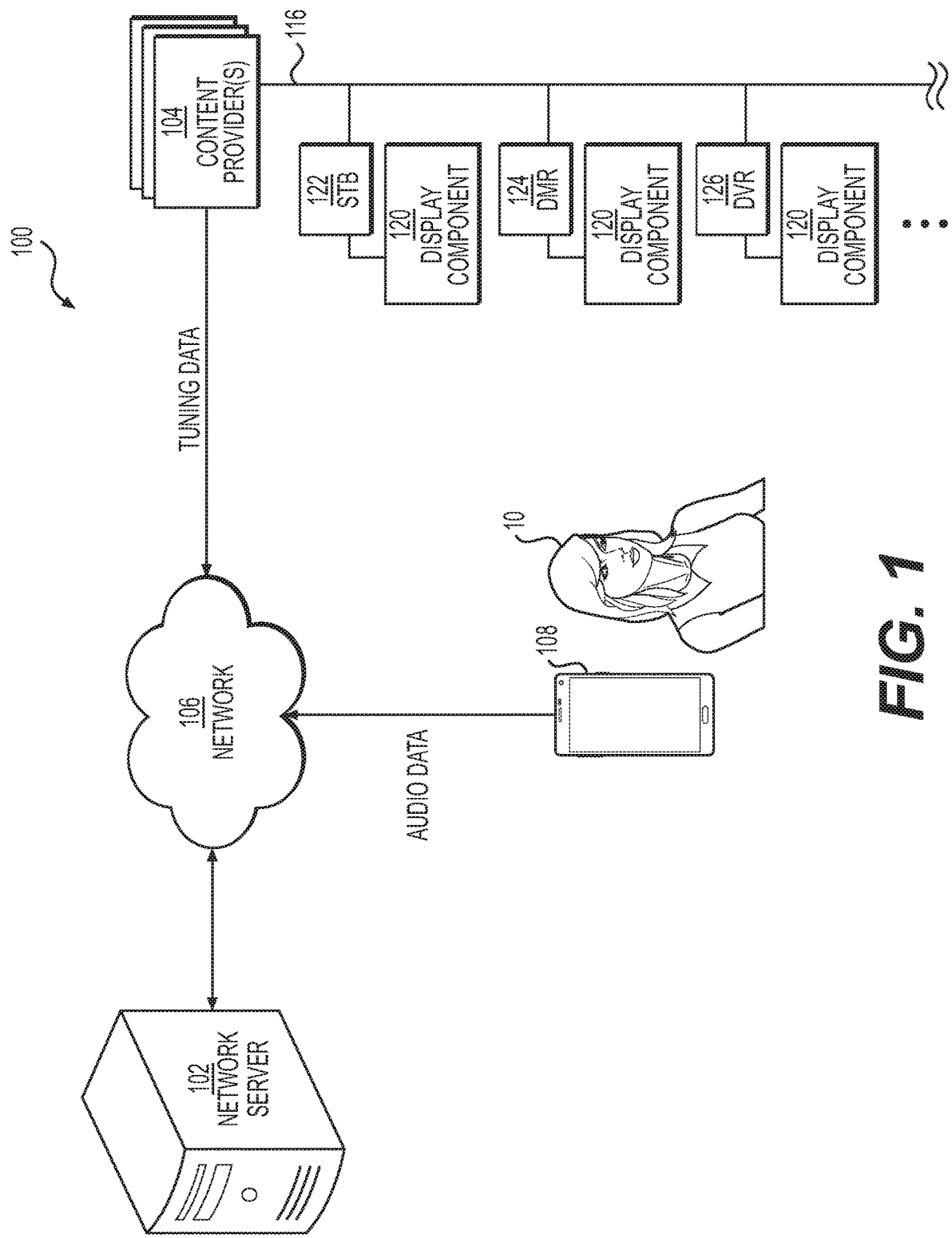
FIG. 1 is a schematic illustration of an exemplary system for determining content accessed by a user.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

Some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

The disclosure is generally directed to a system and method of determining viewership of media content based on processing audio captured by a user device (e.g., a smart phone) and tuning data (e.g., from a cable company). For example, in some embodiments, the captured audio may be correlated to content data to determine recognized media data (e.g., recognized video content). The recognized media data may, in turn, be correlated to tuning data to generate a user array detailing media content accessed by the user. Therefore, based on the user array, a second set of tuning data may be accessed to determine a probability that the user is accessing a second set of media content of the second set of tuning data. Advantageously, the system may enhance the determination of viewership based on personalized audio data captured by the user devices.

FIG. 1 is a schematic illustration of an exemplary environment including an exemplary system 100 for verifying content accessed by a user. As shown in FIG. 1, system 100 may include various components that may be configured to collect and analyze media content (e.g., audio and/or video) accessed by one or more user(s) 10. In some embodiments, system 100 may include a network server 102 configured to communicate with content provider(s) 104, via a network 106. Network server 102 may also be configured to communicate with a user device 108 associated with user 10, via network 106.

Content provider(s) 104 may include any number of providers configured to transmit media content to one or more receivers 122-126. In some embodiments, content provider(s) 104 may include a cable television operator that transmits programming signals to receivers 122-126 through a network of cables 116 (e.g., coaxial or optical cables). Content provider(s) 104 may, additionally or alternatively, include satellite television operators, local or regional broadcasters, and/or any other distributors of media content through network 106. For example, content provider(s) 104 may include providers that stream television, music, and/or podcasts to user(s) 10, via the Internet.

Receivers 122-126 may include any device configured to receive media content from content provider(s) 104 and transmit the media content to one or more display component(s) 120. For example, receivers 122-126 may include a television set top box ("STB") 122, a digital media receiver ("DMR") 124, a digital video recorder ("DVR") 126, an internal tuner, a computer, a satellite receiver, gaming consoles, a network gateway (wired and/or wireless), and/or any other component configured to receive media content from content provider(s) 104 and output the media content to display component(s) 120. Receivers 122-126 may be external or internal to display component(s) 120. For example, receiver (e.g., STB 122) may include an external cable television converter configured to receive the media content via a coaxial cable and transmit the media content to a television. Receiver (e.g., DMR 124) may also include a streaming media player, such as Apple TV™, a Roku™ device, and/or a Chromecast™ device, plugged into an input of a television and be configured to receive and transmit media content to be viewed on a television. In other exemplary embodiment, DMR 124 may include a wireless media card, a processor, and/or hard drive internal to a computer or a smartphone and configured to transmit media to display component(s) 120 of the computer.

Display component(s) 120 may include any device configured to output media content to user(s) 10 in a real-time or time-shifted basis. In some embodiment, display component(s) 120 may include a screen configured to display images (e.g., video) of the media content, and/or one or more speakers configured to output audio of the media content. For example, display component(s) 120 may include a display and/or speakers of a television, a computer, a smartphone, a mobile audio player, a tablet, a radio, a wearable device such as Google Glass™ or a smart watches, or any combination and/or affiliated components thereof. Display component(s) 120 may also include a separate processor and data storage from receiver 122-126, for example, when display component(s) 120 embodies a computer or television, and receiver 122-126 embodies a streaming device (e.g., a Chromecast™ device).

In some embodiments, receivers 122-126 may be configured to generate tuning data indicative of media content accessed by receivers 122-126. Receivers 122-126 may be configured to save the tuning data, for example, in an internal data storage, and/or transmit the tuning data to network server 102. The tuning data may be indicative of media content (e.g., movies, television shows, music) accessed by receivers 122-126 through content provider(s) 104. The tuning data may also be indicative of media content accessed by user(s) 10 offline of the content provider(s) 104, such as media content accessed from an internal storage device of DVR 126. In some embodiments, the tuning data may be transmitted directly from receivers 122-126 to network sever 102 via network 106, and/or transmitted directly from content provider(s) 104 to network server 102, indicative of media content accessed by receivers 122-126.

The tuning data may include, for example, one or more channels accessed by receivers 122-126, the media content outputted to display component(s) 120, and/or a time-date stamp associated with the access (e.g., the date/time the access began, ended, and/or duration). The time-date stamp may be stored in a number of different formats, such as the number of seconds elapsed since a reference time (e.g., epoch, an International Organization for Standardization (ISO) 8601 formatted combined date and time).

As used herein, "channel" may refer to any identifier of a particular source of video content, for example: a network name (e.g., "ABC"), a broadcast organization's call sign (e.g., "KOMO-TV"), an analog or digital broadcast or demodulation frequency (e.g., 615.25 MHz), a "real" channel (which may correspond to an actual transmission frequency (e.g., "38"), a "virtual" channel (not representing an actual frequency, e.g., "SiFy channel"), a main channel by itself (e.g., "4"), a sub channel number by itself (e.g., "0.1"), a main channel combined with a sub channel (e.g., "4.1"), a digital networking address such as an internet protocol ("IP") address, a uniform resource locator ("URL"), or a video sharing website channel (such as a YouTube user's content channel), a content identifier (e.g., "Superbowl 2015", "Seinfeld season 3, episode 2", or the name of a pay per view program), or any other content identifier utilized for cable television, broadcast television, satellite television, internet viewing, and/or other video viewing.

Network server 102 may be configured to receive the tuning data from content provider(s) 104, from third-party aggregators of tuning data (not shown), and/or directly from receivers 122-126 via network 106. Alternatively, on a periodic basis, network server 102 may be configured to receive the tuning data on a computer readable media such as tape drive, DVD, CD-ROM, flash drive, and/or a mechanical or solid state hard drive. By analyzing tuning data, network server 102 may be configured to determine viewing habits, such as the duration that the media content is accessed, a particular source that is accessing the content, and/or a type of media content. The tuning data may also provide such information as channel changes, recording or replaying of media content, and changes in play back of content.

Network server 102 may also be configured to access a database of user(s) 10 associated with receivers 122-126. For example, network server 102 may be configured to access names and/or other identifying information of members (e.g., users 10) of the household associated with the receivers 122-126. Accordingly, network server 102 may be configured to correlate receivers 122-126 to users 10 of the associated household. The tuning data may also be associated with a unique identifier, so that the tuning data is attributable to the respective receiver 122-126. The unique identifier may be an identifier of the customer premises equipment (e.g., the MAC address of the STB for receiver 122-126), an identifier of user 10 associated with receiver 122-126 (e.g., a cable television customer account number, phone number, etc.), a globally unique identifier ("GUID"), the address of the physical location of the display component, and/or similar identifying elements.

System 100 may also include user device 108 configured to capture environmental information, such as audio data indicative of media content being accessed proximate to user device 108. User device 108 may include a personal computing device such as, for example, a general purpose or notebook computer, a mobile device with computing ability, a tablet, smartphone, wearable device such as Google Glass™ or smart watches, or any combination thereof and/or affiliated components. In some embodiments, user device 108 may be a computer system or mobile computer device that is associated with user 10. For example, in some embodiments, user device 108 may be configured to capture environmental audio data and transmit the audio data to network server 102 via network 106.

Figure 2:
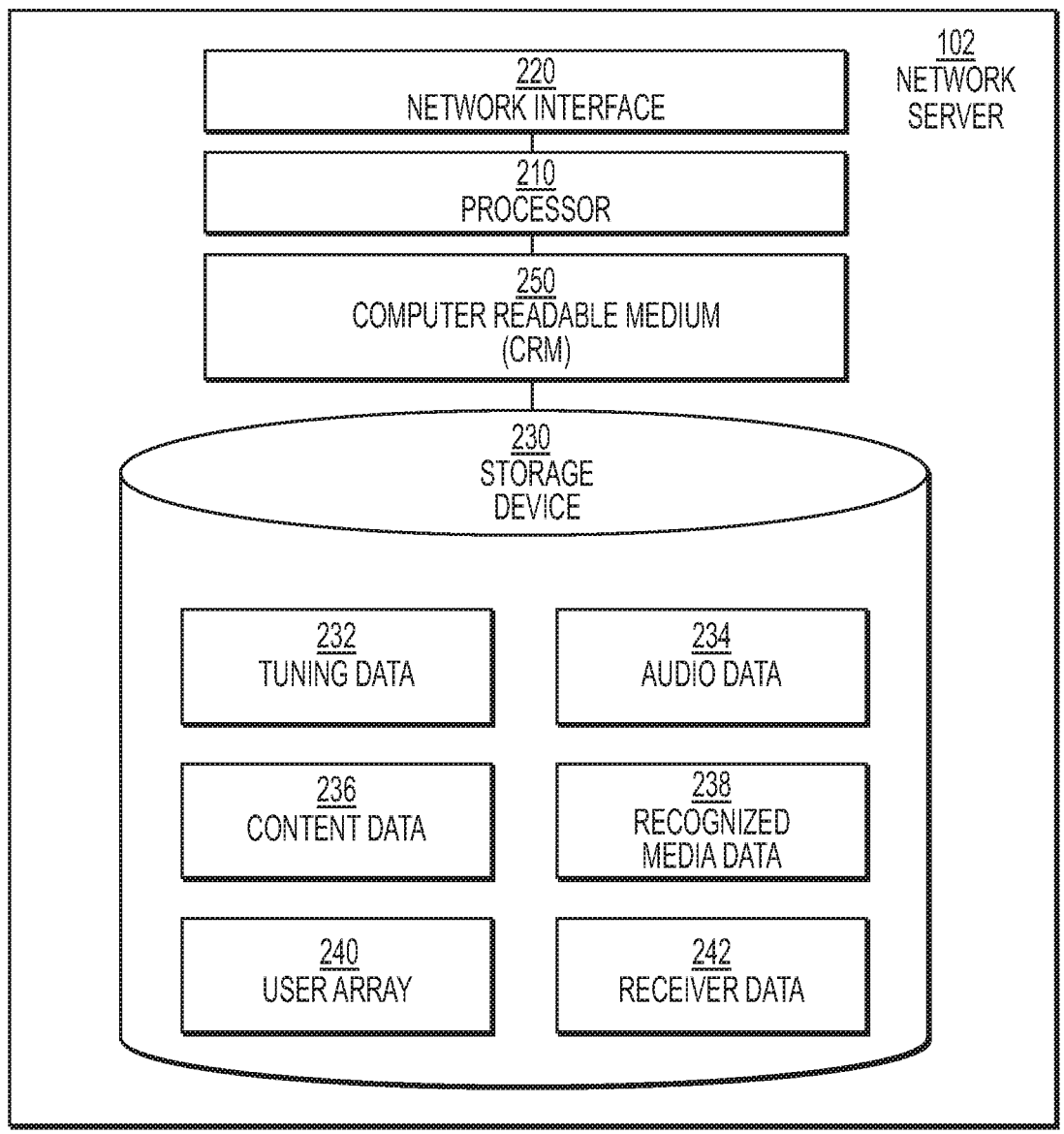
FIG. 2 is a block diagram of an exemplary network server of the exemplary system of FIG. 1.

FIG. 2 is a diagram of an exemplary network server 102, consistent with disclosed embodiments. As shown, network server may include a processor 210, a network interface 220, a storage device 230, and one or more computer readable mediums ("CRM") 250.

Processor 210 may be one or more known processing devices, such as microprocessors manufactured by Intel™ or AMD™ or licensed by ARM. Processor 210 may constitute a single core or multiple core processors that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In some embodiments, processor 210 may be configured to receive data (e.g., tuning data and/or content data) over network 106 via network interface 220. Processor 210 may also be configured to store the data in storage device 230, which may be accessed by network server 102 for further processing. Storage device 230 may be any combination of databases, datasets, flat files, etc. stored in computer memories (e.g., RAM, ROM, or Flash memory), hard drives, remote network servers, or other data storage components or computer-readable storage devices. Although a single storage device 230 is illustrated in FIG. 2, it will be appreciated that the storage area may include multiple storage devices 230. Storage device 230 may store data that is utilized, generated, or modified by the system, such as, tuning data 232, audio data 234, content data 236, recognized media data 238, user arrays 240, and/or receiver data 242.

CRM 250 may include computer-readable instructions encoded for performing an analysis of data 232-240. CRM 250 may be coupled to processor 210, which executes the stored instructions in order to implement the functionality disclosed herein. In particular, network server 102 may include instructions specifying a particular module of one or more modules located within CRM 250 to perform one or more functions on stored data, such as data 232-240. The operation of CRM 250 will be described in the following paragraphs with further reference to the process and schematics illustrated in FIGS. 4-7.

Figure 3:
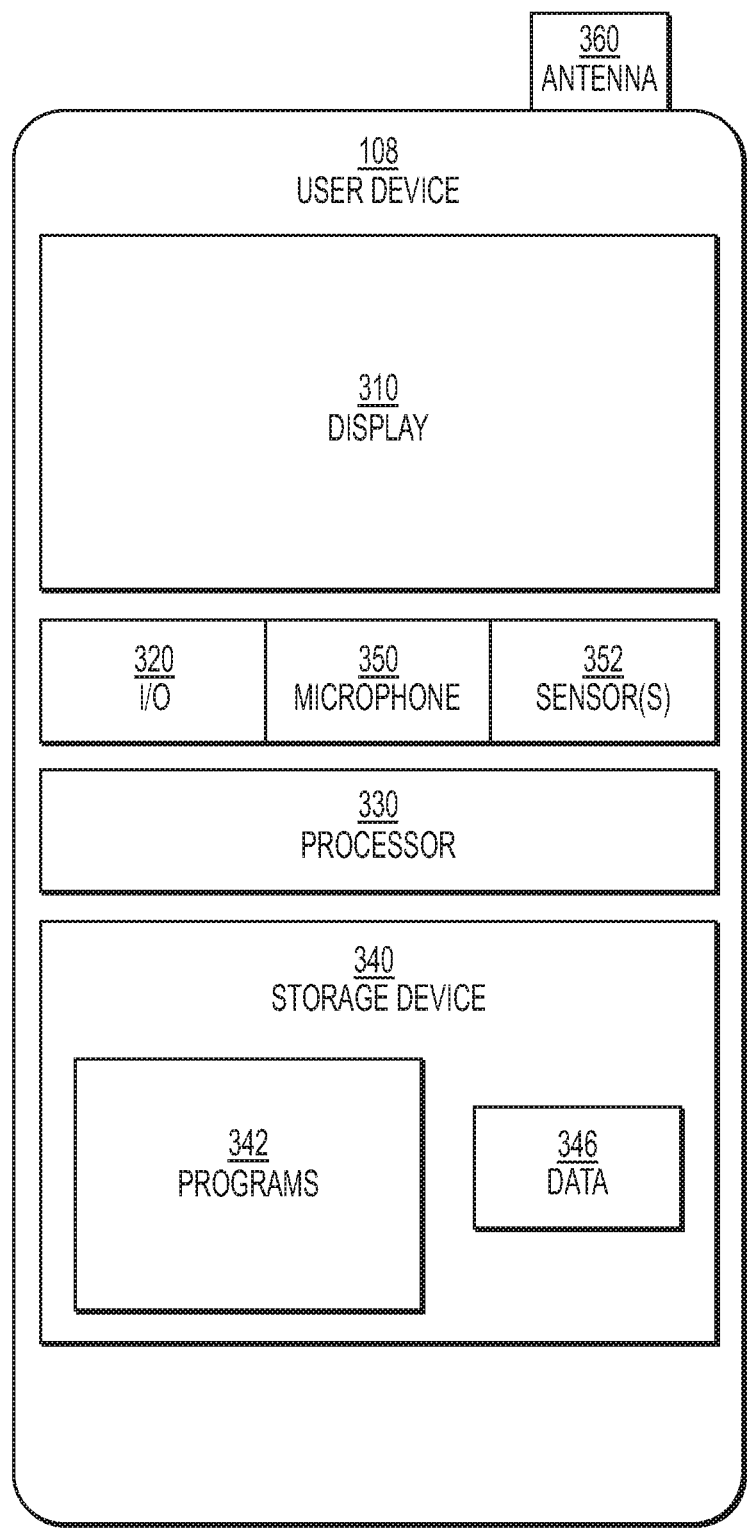
FIG. 3 is a block diagram of an exemplary user device of the exemplary system of FIG. 1.

FIG. 3 shows a diagram of an exemplary user device 108, consistent with disclosed embodiments. As shown, user device 108 may include display 310, I/O device(s) 320, processor 330, storage device 340 having stored thereon one or more programs 342 and data 346, a microphone 350, sensor(s) 352, and/or an antenna 360.

Display 310 may include one or more devices for displaying information, including but not limited to, liquid crystal displays ("LCD"), light emitting diode ("LED") screens, organic light emitting diode ("OLED") screens, and other known display devices.

I/O devices 320 may include one or more devices that allow user device 108 to send and receive information. I/O devices 320 may include, for example, a pointing device, keyboard, buttons, switches, and/or a touchscreen panel. I/O devices 320 may also include one or more communication modules (not shown) for sending and receiving information via antenna 360 from other components in system 100 by, for example, establishing wired or wireless connectivity between user device 108 to network 106, or by establishing direct wired or wireless connections between user device 108 and other components of system 100. Direct connections may include, for example, Bluetooth™, Bluetooth LE™, WiFi, near field communications (NFC), or other known communication process which provide a medium for transmitting data between separate devices.

Processor(s) 330 may include one or more known computing devices, such as those described with respect to processor 210 in FIG. 2. Storage device 340 may include any known storage device, such as those described with respect to storage device 230 in FIG. 2.

In some embodiments, user device 108 may include a microphone 345 and one or more sensors 352 for collecting environmental data. For example, microphone 345 may be configured to capture audio from the environment proximate to user device 108. User device 108 may be configured to capture raw audio signals and transmit it to network server 102. User device 108 may, additionally or alternatively, be configured to process the captured audio prior to transmitting to network server 102. Sensor(s) 352 may include other environmental sensors such as, for example, GPS receivers, location-based data receivers, accelerometers, and gyroscopes. For example, sensor(s) 352 may be configured to detect positioning data indicative of a location of user device 108, and transmit the positioning data to network server 102. In some embodiments, processor 330 may use data collected by microphone 350 and/or sensors 352 to control or modify functions of program(s) 342.

Figure 4:
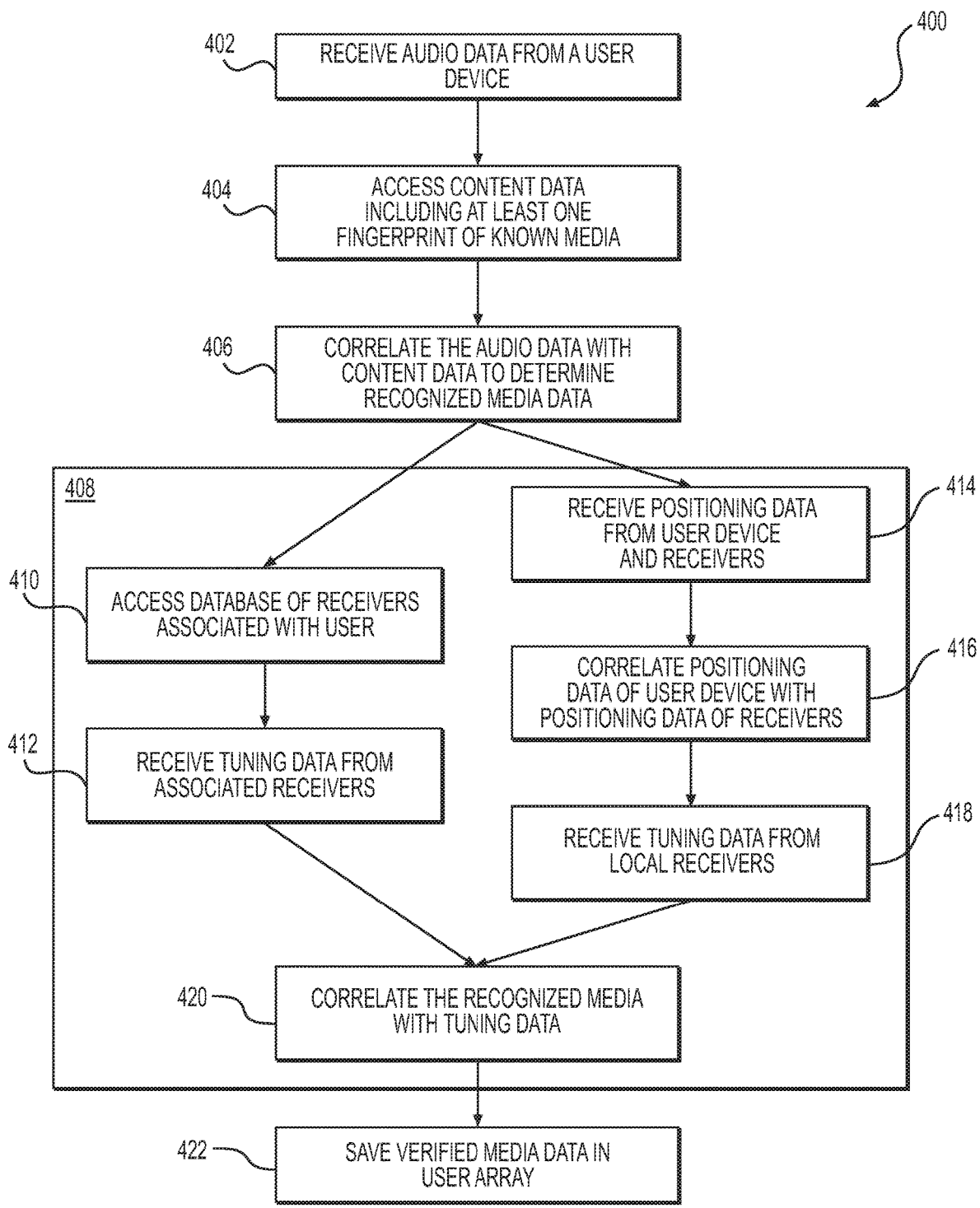
FIG. 4 is a flowchart illustrating a first exemplary process that may be performed by the exemplary system of FIG. 1.

FIG. 4 is a flowchart illustrating an exemplary process 400 of verifying recognized audio data associated with user 10. Process 400 may provide the advantage of ensuring accuracy of media content detected by user device 108 based on tuning data from content provider 104. Process 400 may also advantageous populate a user array including data of media content that has been accessed specifically by user 10. Process 400 is described herein as performed primarily by network server 102, however in some embodiments, content provider(s) 104, user device 108, and/or receivers 122-126 may perform or more steps of process 400.

Process 400 may begin with step 402 when network server 102 receives audio data from user device 108. In some embodiments, the data may be captured by microphone 345 and transmitted to network server 102, via network 106. In some embodiments, the audio data may include audio of media content outputted by display component 120. For example, in some embodiments, the captured audio data may include discrete segments (e.g., half a second in length) or continuous lengths of unprocessed audio captured from microphone 345. The audio data may also be processed to reduce noise in the data, for example, by filtering based on frequency or amplitude of the audio signal.

In step 404, network server 102 may receive content data. The content data may include raw audio signal data or some audio signature of an audio signal. The audio signatures may be associated with various audio or video media content (e.g., video content of a televised show). The audio signatures may not be represented as audio by may instead comprise extracted feature vectors and may be partially or wholly compressed. For example, the system may use a mathematical function (e.g., a Fourier Transform) of an audio signal, commonly referred to as an "audio fingerprint." In some embodiments, the content data may be stored on a third party server and accessed by network server 102 via network 106. In some embodiments, the content data may be stored locally, for example, in storage device 230. The audio signature or fingerprint may include a condensed digital summary of segments of known media content, and may facilitate identification of the captured audio data. The content data may include at least one audio signature or fingerprint for any number of television shows, movies, podcasts, video games, and/or music. The content data may be continuously updated with additional audio signatures or fingerprints in order to enhance media data recognition and/or recognize new media content.

Figure 5:
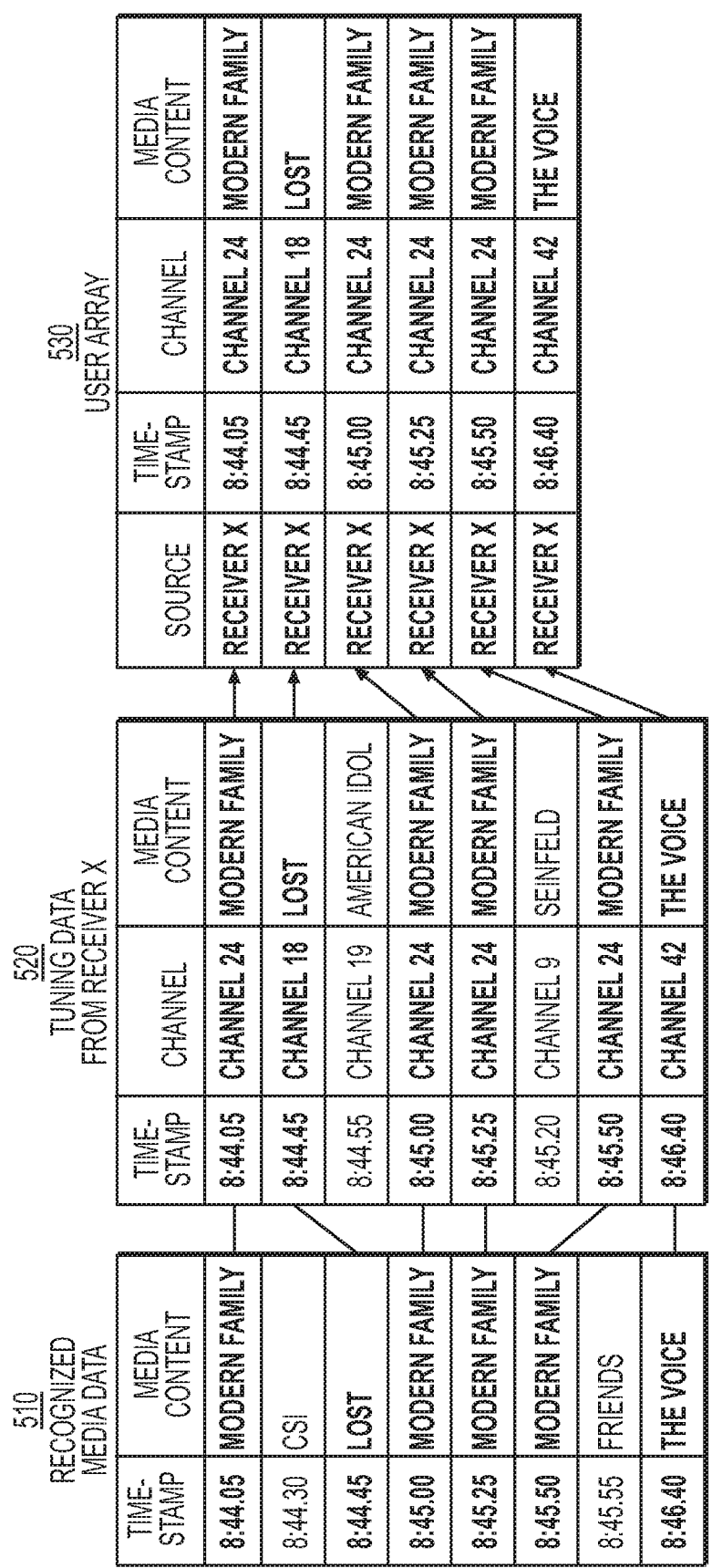
FIG. 5 is a first schematic of exemplary steps of the exemplary process of FIG. 4.

In step 406, network server 102 may correlate the captured audio data with the stored content data to determine recognized media data. For example, in some embodiments, network server 102 may compare the raw signal of the audio data to the content data to determine the recognized media data (e.g., as depicted in FIG. 5). In some embodiments, network server 102 may process the audio data (e.g., using Fast Fourier Transformation), and compare the processed amplitudes of the audio data in a frequency domain to the at least one fingerprint of the content data. For example, network server 102 may correlate the captured audio with the stored content data to determine that user device 108 is capturing audio from Episode 1 of Season 2 of "Modern Family." In some embodiments, the correlation may also indicate the exact time (hours, seconds, and minutes) based on the length of the media content. Based on correlations determined in step 406, network server 102 may be configured to perform computer learning to refine the content data to include the known correlations.

In step 408, network server 102 may perform another layer of correlation on the recognized media content. Such additional correlation may help to verify the accuracy of the recognized media content. The network server 102 may perform such verification using tuning data (e.g., as depicted in FIG. 5), for example, from content providers 104. As depicted in FIG. 4, the verifying may be performed by one or more processes. For example, steps 410-412 illustrate a process of verifying the media based on stored associations of receivers 122-126, and steps 414-418 illustrate a process of verifying the media data based on positioning data. It is contemplated that the process of steps 410-412 may be performed, additionally or alternatively, to the process of steps 414-418. For example, in some embodiments, the process of steps 410-412 may be used in conjunction with the process of steps 414-418 to limit the tuning data to be processed. Narrowing the tuning data to be processed may limit the processing and storage requirements.

According to the verification process based on associations, in step 410, network server 102 may access a database of receivers 122-126 associated with user 10. For example, network server 102 may determine one or more user(s) 10 associated with user device 108, and query databases of receivers 122-126 associated with the one or more users(s) 10. For example, when user device 108 is a registered iPhone, network server 102 may query a database of Apple™ receivers 122-126 to determine that user 10 also registered an iPad™, an Apple TV™, and/or a MacBook™. Network server 102 may also query databases of other receivers 122-126, such as a Roku™ device, other computers, cable television accounts, internet access, and/or streaming television subscriptions.

In step 412, network server 102 may receive tuning data from associated receivers 122-126. For example, network server 102 may receive tuning data including media content accessed by one or more receivers 122-126 associated with user 10 of user device 108. For example, the tuning data may indicate that an Apple TV™ associated with user 10 is streaming "Modern Family" from the channel, ABC. The tuning data may also indicate that a cable television account associated with user 10 is accessing "House Hunters" from the cable channel, HGTV. Network server 102 may store the tuning data, for example, in storage device 230 to be accessed and correlated with the recognized media data.

According to the verification process based on positioning data, in step 414, network server 102 may receive positioning data from user device 108 and from one or more receivers 122-126. For example, in some embodiments, network server 102 may access GPS data from user device 108 indicating the location of user 10. Network server 102 may also access GPS data from one or more receivers 122-126 indicating the location of each receiver 122-126. For example, the positioning data from receivers 122-126 may be based on an address of a cable television account. The positioning data from receivers 122-126 may, additionally or alternatively, be based on built in sensors, similar to sensor(s) 352 of FIG. 3.

In step 416, network server 102 may correlate the positioning data of user device 108 with the positioning data of one or more receivers 122-126 of step 414 to determine local receivers. For example, in some embodiments, the correlation of step 416 may determine which receivers 122-126 are proximate to a current location of user device 108. Network server 102 may determine that an Apple TV™ is located within ten meters of a current position of user device 108, but an address accessing cable television is located a few miles from user device 108. Accordingly, step 416 may indicate that the Apple TV™ is a local receiver 122-126.

In step 418, network server 102 may receive tuning data from local receivers. For example, in step 418, network server 102 may receive tuning data in a similar manner as step 412.

In step 420, network server 102 may correlate the recognized media data with the tuning data. For example, network server 102 may compare the recognized media data of step 406 to the tuning data of step 412 and/or step 418. Network server 102 may determine media content common between the recognized media data and the tuning data. For example, if the media content (e.g., Modern Family) of the recognized media data is also in the tuning data, network server 102 may verify that user 10 accessed Modern Family.

Figure 6:
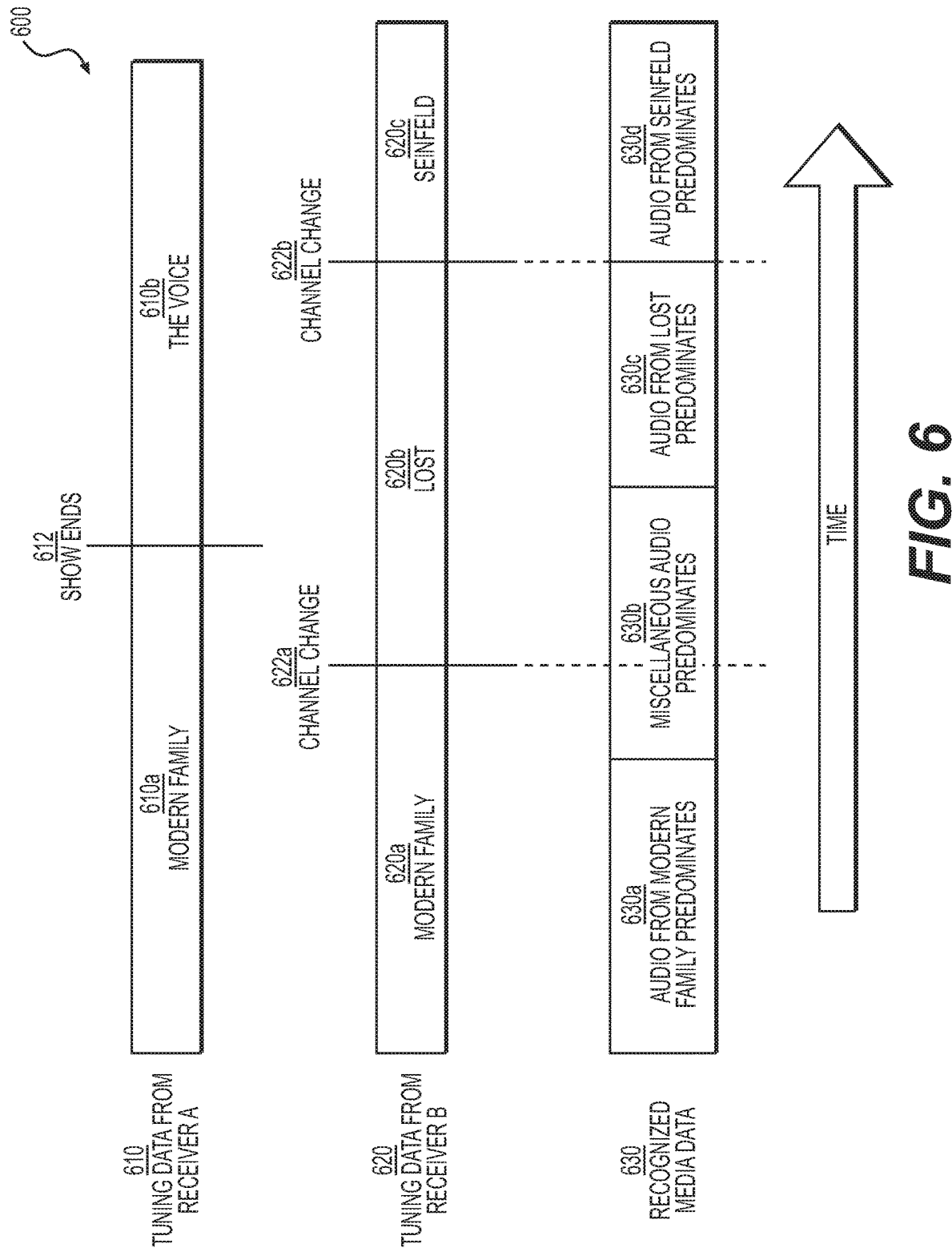
FIG. 6 is a second schematic of exemplary steps of the exemplary process of FIG. 4.

In step 422, network server 102 may save the verified media data in a user array (e.g., as depicted in FIG. 5). For example, the user array may indicate receivers 122-126 that user 10 accessed, media content that user 10 has accessed, channels that user 10 has accessed, and/or time-date stamps of access. The data of the user array may be processed to extract viewing habits, frequented locations, and/or exposure to advertisements. Process 400 may be repeated to store data into user array from a plurality of receivers 122-126 (e.g., as depicted in FIG. 6).

FIG. 5 is an exemplary schematic 500 of exemplary steps of process 400. As indicated in FIG. 5, recognized media data 510 (e.g., determined in step 440) may have data fields, such as a time-date stamp of when the audio was captured and the recognized media content. For example, recognized media data 510 may indicate a television show from which the audio was captured. It is also contemplated that recognized media data 510 may include additional fields, such as an indication of a recognized segment of the recognized media content and/or strength of audio signal of the captured audio.

Tuning data 520 (e.g., received in steps 412 and/or 416) may include a number of data fields. For example, the tuning data may include data fields, such as time-date stamps that the tuning data is accessed by receivers 122-126, the channel being transmitted, and/or the media content being transmitted. The tuning data may include additional fields, such as the source of the tuning data and the type of the media content.

User array 530 (e.g., stored in step 422) may be populated based on a correlation of recognized media data 510 and tuning data 520 (e.g., at step 420). For example, user array 530 may be populated by verified media content based on common data, for example, (1) being captured in audio data by user device 108, and (2) being transmitted in tuning data to one or more receivers 122-126. User array 530 may include data fields, such as the source of the tuning data and/or recognized media data, time-date stamp of access, channel the tuning data was accessed on, and/or the media content.

FIG. 6 is an exemplary schematic 600 of exemplary steps of process 400. As depicted in FIG. 6, system 100 may be configured to correlate recognized audio data with tuning data from a plurality of receivers 122-126, for example, in a household. For example, user device 108 may be configured to capture audio data which is processed to generate recognized media data 630. Since there may be a plurality of sources within proximity, user device 108 may capture audio from a plurality of receivers 122-126 and/or display components 120. For example, as user 10 moves throughout a household, user device 108 may capture audio from receiver A (e.g., STB 122) and receiver B (e.g., DMR 124). Receiver A may be outputting a first set of tuning data 610, and receiver B may be outputting a second set of tuning data 620. Tuning data 610 outputted by receiver A may include a first show 610a (e.g., Modern Family) and a second show 610b (e.g., The Voice), separated temporally by a tuning event 612 (e.g., first show 610a ending). Tuning data 620 transmitted to receiver B may include a first show 620a (e.g., Modern Family), a second show 620b (e.g., Lost), and a third show 620c (e.g., Seinfeld), separated temporally by tuning events 622a, 622b (e.g., channel changes). User device 108 may capture audio from each of receiver A and B at different signal strengths based on the outputted audio levels of receiver A and B, and/or a distance of user device 108 from receivers A and B. The captured audio is then processed to generate recognized media data 630.

In some embodiments, system 100 may correlate recognized media data 630 with each of tuning data 610, 620 to determine which of receivers 122-126 that user 10 is likely viewing. In this example, recognized media data 630 includes a first segment 630a where audio from Modern Family predominates, a second segment 630b where miscellaneous noise predominates (e.g., as the user moves around the household), a third segment 630c where audio from Lost predominates, and a fourth segment 630d where audio from Seinfeld predominates. Based on recognized media data 630, system 100 may readily identify that user 10 was physically proximate to receiver B during segments 630c-d. The correlation of tuning event 622b between recognized media data 630 and tuning data 620 would strongly suggest that receiver B was in proximity to user device 108. In contrast, it's not immediately clear which of receiver A and B were being overheard during segment 630b. In some embodiments, the devices may be distinguished based upon previously assessed audio qualities (e.g., the pitch and delay resultant from placement receivers A and B in the environment) as well as temporal qualities (e.g., which of receivers A and B was most recently identified as being in proximity). In some embodiments, the preceding behavior of user 10 (e.g., whether it was determined that user 10 entered a room of one of receivers A and B), the character of programming distinctions at Receiver A and B, and/or positioning data of user device 108 may be used to distinguish receivers A and B. In this manner, system 100 may infer receiver A or B being viewed by user 10 based upon audio captured by user device 108. If segments 630a-d do not correlated with receivers A or B, system 100 may query other receivers (e.g., DVR 126) to determine correlations. Receivers A and B may be determined based on associations (e.g., at step 410) and/or positioning data (e.g., at steps 414-416) in order to reduce the data processing required.

Figure 7:
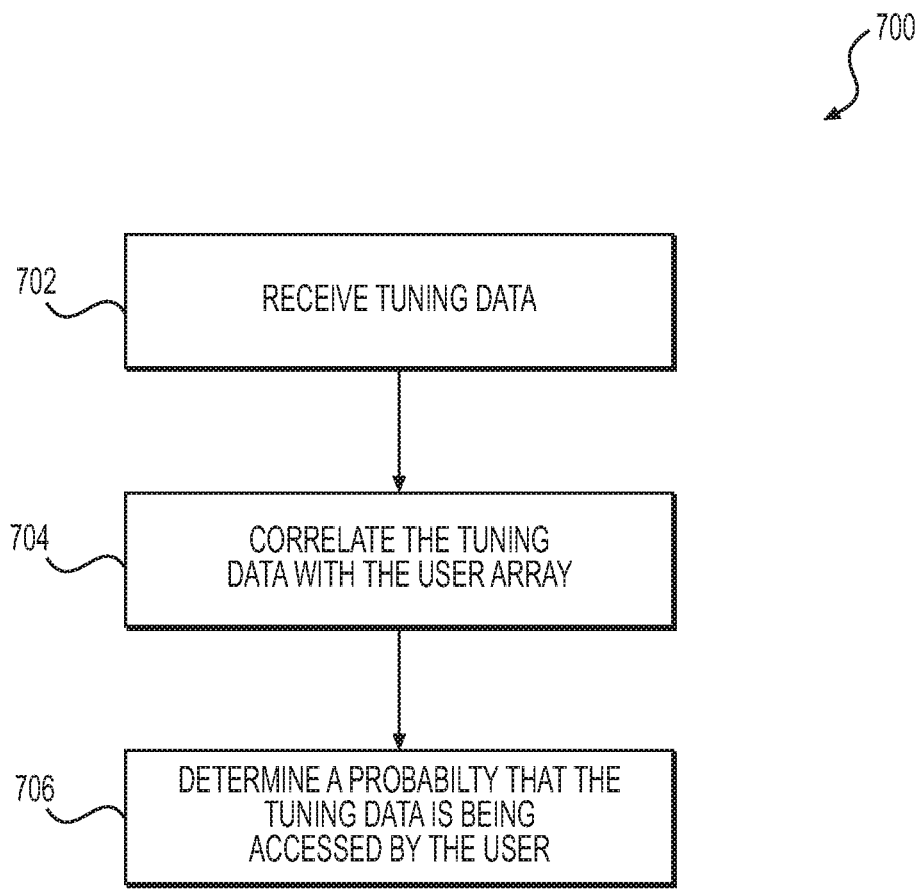
FIG. 7 is a flowchart illustrating a second exemplary process that may be performed by the exemplary system of FIG. 1.

FIG. 7 is a flowchart illustrating a second exemplary process 700 that may be performed by system 100. Process 700 may generate a probability that user(s) 10 are accessing tuning data based on correlations with a user array. In an aspect, process 700 does not require additional audio data captured by user device 108 in order to generate the probability. Process 700 may also map a viewing profile based on accessing a plurality of user arrays 530.

In step 702, network server 102 may receive tuning data. For example, network server 102 may receive tuning data transmitted from content provider(s) 104 to one or more of receiver(s) 122-126. The tuning data may include a television show accessed at STB 122 and the type of the television show. For example, the tuning data may indicate that the television show is a daytime drama.

In step 704, network server 102 may correlate the tuning data with one or more user arrays (e.g., 530). For example, network server 102 may access the user arrays 530 associated with users 10 of the household of STB 122. Network server 102 may also compare the data fields of the tuning data to data fields of user array 530. For example, network server 102 may determine the frequency that the STB 122 is accessed by each user 10 at the time-date stamp of the tuning data. Network server 102 may also determine whether the user array is populated by daytime dramas.

In step 706, network server 102 may determine a probability that the media data is being accessed by user 10 associated with user array 530. The probability may be based, in part, on the frequency that the STB 122 is accessed by the user 10.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware, firmware, and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed methods can be modified in any manner, including by reordering steps or inserting or deleting steps.

What is claimed is:

1. A method implemented with at least one processor, the method comprising:
   receiving audio data from a microphone of a device associated with a user, the audio data including audio received by the microphone from a first source and from a second source;
   correlating the audio data with a first audio signature and a second audio signature;
   identifying, based on the correlation of the audio data with the first audio signature, first content broadcast from the first source;
   identifying, based on the correlation of the audio data with the second audio signature, second content broadcast from the second source;
   determining that the device is closer to the first source than the second source based on audio qualities and/or temporal aspects of the audio data; and
   associating, based on the determination that the device is closer to the first source, the first content with the user.

2. The method of claim 1, further comprising accessing account data associating the first source and the second source to the user.

3. The method of claim 1, further comprising:
   receiving positioning data of the device;
   receiving positioning data of the first source and the second source; and
   comparing the positioning data of the device with the positioning data of the first source and the second source to determine that the first source and the second source are local sources.

4. The method of claim 1, wherein correlating the audio data with the first audio signature and the second audio signature comprises:
   generating audio fingerprints of the audio data,
   comparing audio fingerprints of the audio data to the first audio signature and the second audio signature.

5. The method of claim 4, wherein generating the audio fingerprints of the audio data comprises processing the audio data using a Fourier Transform function.

6. The method of claim 1, further comprising:
   determining that third content is being broadcast; and
   determining, based on the association of the first content with the user, a probability that the third content is being broadcast to the user.

7. The method of claim 1, further comprising:
   receiving first program data indicating content being broadcast from the first source;
   receiving second program data indicating content being broadcast from the second source;
   correlating the first content with the first program data; and
   correlating the second content with the second program data.

8. The method of claim 1, wherein associating the first content with the user comprises storing the first content in an array associated with the user.

9. The method of claim 1, wherein the first content is first video content, the first source is a first display component, the second content is second video content, and the second source is a second display component.

10. The method of claim 1, wherein the device associated with the user is a notebook computer, a mobile device, a tablet, smartphone, or a wearable device.

11. A system, comprising:
    at least one processor; and
    at least one memory storing instructions that, when executed, cause the at least one processor to perform a process, the process comprising:
      receiving audio data from a microphone of a device associated with a user, the audio data including audio received by the microphone from a first source and from a second source;
      correlating the audio data with a first audio signature and a second audio signature;
      identifying, based on the correlation of the audio data with the first audio signature, first content broadcast from the first source;
      identifying, based on the correlation of the audio data with the second audio signature, second content broadcast from the second source;
      determining that the device is closer to the first source than the second source based on audio qualities and/or temporal aspects of the audio data; and associating, based on the determination that the device is closer to the first source, the first content with the user.

12. The system of claim 11, wherein the process further comprises accessing account data associating the first source and the second source to the user.

13. The system of claim 11, wherein the process further comprises:
receiving positioning data of the device;
receiving positioning data of the first source and the second source; and
comparing the positioning data of the device with the positioning data of the first source and the second source to determine that the first source and the second source are local sources.

14. The system of claim 11, wherein correlating the audio data with the first audio signature and the second audio signature comprises:
generating audio fingerprints of the audio data,
comparing audio fingerprints of the audio data to the first audio signature and the second audio signature.

15. The system of claim 11, wherein the process further comprises:
determining that third content is being broadcast; and
determining, based on the association of the first content with the user, a probability that the third content is being broadcast to the user.

16. A non-transitory computer-readable medium storing instructions which, when executed, cause one or more processors to perform a process, the process comprising:
receiving audio data from a microphone of a device associated with a user, the audio data including audio received by the microphone from a first source and from a second source;
correlating the audio data with a first audio signature and a second audio signature;
identifying, based on the correlation of the audio data with the first audio signature, first content broadcast from the first source;
identifying, based on the correlation of the audio data with the second audio signature, second content broadcast from the second source;
determining that the device is closer to the first source than the second source based on audio qualities and/or temporal aspects of the audio data; and
associating, based on the determination that the device is closer to the first source, the first content with the user.

17. The non-transitory computer-readable medium of claim 16, wherein the process further comprises accessing account data associating the first source and the second source to the user.

18. The non-transitory computer-readable medium of claim 16, wherein the process further comprises:
receiving positioning data of the device;
receiving positioning data of the first source and the second source; and
comparing the positioning data of the device with the positioning data of the first source and the second source to determine that the first source and the second source are local sources.

19. The non-transitory computer-readable medium of claim 16, wherein correlating the audio data with the first audio signature and the second audio signature comprises:
generating audio fingerprints of the audio data,
comparing audio fingerprints of the audio data to the first audio signature and the second audio signature.

20. The non-transitory computer-readable medium of claim 16, wherein the process further comprises:
determining that third content is being broadcast; and
determining, based on the association of the first content with the user, a probability that the third content is being broadcast to the user.

* * * * *